(12) United States Patent
Kimoto

(10) Patent No.: US 10,268,008 B2
(45) Date of Patent: Apr. 23, 2019

(54) PLASTIC OPTICAL FIBER RIBBON

(71) Applicant: AGC Inc., Chiyoda-ku (JP)

(72) Inventor: Osakazu Kimoto, Chiyoda-ku (JP)

(73) Assignee: AGC Inc., Chiyoda-ku (JP)

(*) Notice: Subject to any disclaimer, the term of this patent is extended or adjusted under 35 U.S.C. 154(b) by 0 days.

(21) Appl. No.: 15/613,501

(22) Filed: Jun. 5, 2017

(65) Prior Publication Data

US 2017/0351045 A1 Dec. 7, 2017

(30) Foreign Application Priority Data

Jun. 7, 2016 (JP) .................................. 2016-113630

(51) Int. Cl.
*G02B 6/44* (2006.01)
*G02B 6/02* (2006.01)

(52) U.S. Cl.
CPC ........... *G02B 6/4403* (2013.01); *G02B 6/443* (2013.01); *G02B 6/448* (2013.01); *G02B 6/02033* (2013.01)

(58) Field of Classification Search
CPC ....... G02B 6/4403; G02B 6/448; G02B 6/443
See application file for complete search history.

(56) References Cited

U.S. PATENT DOCUMENTS

| | | | | |
|---|---|---|---|---|
| 5,457,762 A | * | 10/1995 | Lochkovic | G02B 6/4403 385/114 |
| 6,885,799 B2 | * | 4/2005 | Lee | G02B 6/4403 385/114 |
| 9,475,239 B2 | * | 10/2016 | Abernathy | B29D 11/00663 |

FOREIGN PATENT DOCUMENTS

JP 2014-205780 10/2014

* cited by examiner

*Primary Examiner* — John Bedtelyon
(74) *Attorney, Agent, or Firm* — Oblon, McClelland, Maier & Neustadt, L.L.P.

(57) ABSTRACT

To provide an optical fiber ribbon whereby a plastic optical fiber can be used in such a state that the tensile strength is good. A plastic optical fiber ribbon 10 characterized in that at least one plastic optical fiber 1 and at least one plastic wire 2 having a Young's modulus of at least 3,000 MPa are arranged so that their central axes are parallel to each other in the same plane, and integrated by a collective coating 3.

13 Claims, 3 Drawing Sheets

PLASTIC OPTICAL FIBER RIBBON

TECHNICAL FIELD

The present invention relates to a plastic optical fiber ribbon.

BACKGROUND ART

As a mode of using a plastic optical fiber, Patent Document 1 discloses an optical fiber cable having the structure shown in FIG. 4. In this optical fiber cable, a plastic optical fiber 51 is covered with a reinforcing layer 52 and further covered with a resin layer 53 such as a color coat layer to form a plastic optical fiber 54, four of which are arranged in parallel to have a collective coating 55 applied to form an optical fiber ribbon 56 and further covered with an outermost covering layer 57.

In order to improve the strength of the optical fiber cable, it is described that a reinforcing material such as a tension member (not shown) may be contained in the outermost covering layer 57.

When connecting such an optical fiber cable to an equipment, etc., it is necessary to remove the outermost covering layer 57 at the tip portion to take out the optical fiber ribbon 56 and the tension member, respectively, and then to connect and fix the optical fiber ribbon 56 to the equipment, etc. and at the same time to fix the tension member to an appropriate part.

PRIOR ART DOCUMENT

Patent Document

Patent Document 1: JP-A-2014-205780

DISCLOSURE OF INVENTION

Technical Problem

Since a plastic optical fiber has a weak tensile strength as compared with a glass optical fiber, improvement of the tensile strength is an important subject. In the conventional structure, after the connection, the tensile strength during use is not necessarily sufficient, and further improvement is required.

An object of the present invention is to provide an optical fiber ribbon whereby a plastic optical fiber can be used in such a state that the tensile strength is good.

Solution to Problem

The present invention provides the following plastic optical fiber ribbon.

[1] A plastic optical fiber ribbon characterized in that at least one plastic optical fiber and at least one plastic wire having a Young's modulus of at least 3,000 MPa are arranged so that their central axes are parallel to each other in the same plane, and integrated by a collective coating.

[2] The plastic optical fiber ribbon according to [1], wherein the Young's modulus of the plastic optical fiber is from 750 to 2,500 MPa.

[3] The plastic optical fiber ribbon according to [1] or [2], wherein the outer diameter of the plastic wire is larger than the outer diameter of the plastic optical fiber, and the difference is at least 10 µm.

[4] The plastic optical fiber ribbon according to any one of [1] to [3], wherein the outer diameter of the plastic wire is larger than the outer diameter of the plastic optical fiber, and the difference is from 10 to 110 µm.

[5] The plastic optical fiber ribbon according to any one of [1] to [4], wherein at least two plastic optical fibers are provided, and the outer surfaces of the plastic optical fibers are in contact with one another.

[6] The plastic optical fiber ribbon according to any one of [1] to [5], wherein the Young's modulus of the collective coating is at least 400 MPa.

[7] A method for producing the plastic optical fiber ribbon according to any one of [1] to [6], wherein in a state where at least one plastic optical fiber and at least one plastic wire having a Young's modulus of at least 3,000 MPa are aligned in parallel and in a row, a resin is applied to their outer circumferences and cured to form a collective coating.

[8] The method for producing the plastic optical fiber ribbon according to [7], wherein the application of the resin is carried out by a method in which the plastic optical fiber and the plastic wire are permitted to enter and run through a coating die.

Advantageous Effect of Invention

According to the plastic optical fiber ribbon of the present invention, the plastic optical fiber can be used in such a state that the tensile strength is good.

DETAILED DESCRIPTION OF EMBODIMENTS

In the present specification, the Young's modulus of a plastic wire and the Young's modulus of an optical fiber are values obtained by the following method.

Using a tensile tester AUTOGRAPH AG-IS (product name) manufactured by Shimadzu Corp., measurements are carried out in accordance with JIS-C6837 with a sample length of 100 mm, a tensile speed of 100 mm/min, and a measured number of n=5, to obtain a stress-strain curve. The Young's modulus is calculated from the slope of the stress-strain curve corresponding to the two points of the strain amount $\varepsilon 1=0.1\%$ and $\varepsilon 2=1\%$ of the obtained stress-strain curve.

In the present specification, the Young's modulus of the collective coating is a value obtained by the following method.

In accordance with JIS-K7161, the Young's modulus is measured using a specimen conforming to JIS-K7127 Type 5. The test specimen is prepared by molding the material to form a collective coating into a predetermined shape and curing it. Curing conditions are 0.3 J/cm² and curing in air, and the film thickness is 250 µm.

Figure 1:
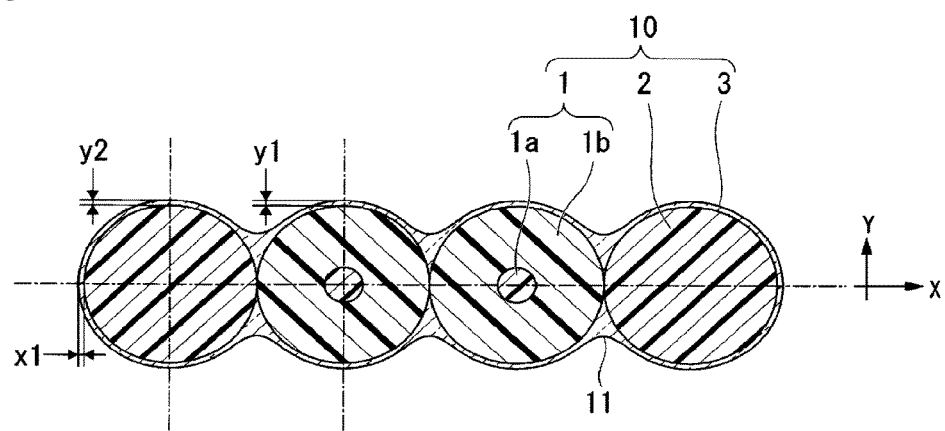
FIG. 1 is a cross-sectional view showing one embodiment of the plastic optical fiber ribbon of the present invention.

FIG. 1 shows one embodiment of the plastic optical fiber ribbon of the present invention. Reference symbol 1 represents a plastic optical fiber (hereinafter also referred to as optical fiber), reference symbol 2 represents a plastic wire, reference symbol 3 represents a collective coating, and reference symbol 10 represents a plastic optical fiber ribbon (hereinafter also referred to as optical fiber ribbon).

The optical fiber ribbon 10 of the present embodiment is obtained by arranging two optical fibers 1 and two plastic wires 2 in parallel and in a row and integrating them by applying a collective coating 3 to their outer circumferences. The central axes of the optical fibers 1 and the plastic wires 2 are present in the same plane and are parallel to one another.

In FIG. 1, the length direction of the optical fibers 1 is defined as the Z direction (not shown), the direction of the straight line connecting the centers of the optical fibers 1 and the plastic wires 2 in the cross section perpendicular to the Z direction is defined as the X direction, and the direction perpendicular to the Z direction and the X direction is defined as the Y direction. The X direction is also referred to as the width direction of the optical fiber ribbon 10, and the Y direction is also referred to as the thickness direction of the optical fiber ribbon 10.

The two optical fibers 1 are arranged adjacent to each other, and their outer surfaces are in contact with each other. The two plastic wires 2 are arranged on the outer side so as to sandwich these two optical fibers 1. The outer surfaces of the adjacent optical fiber 1 and plastic wire 2 are in contact with each other.

In the present invention, the outer surfaces of the optical fibers or the plastic wires being in contact with each other means that the shortest distance between the outer surfaces of adjacent optical fibers or plastic wires is at most 5 μm as an allowable range of manufacturing error.

In the present embodiment, the collective coating 3 is shaped to follow the outer surfaces of the optical fibers 1 and the plastic wires 2, and concave grooves 11 are formed on the outer surfaces on both sides in the thickness direction (Y direction) of the optical fiber ribbon 10.

The optical fiber 1 of the present embodiment is composed of one plastic optical fiber 1a and a reinforcing layer 1b covering its outer circumference. If necessary, another covering layer may be provided around the reinforcing layer 1b.

Figure 5:
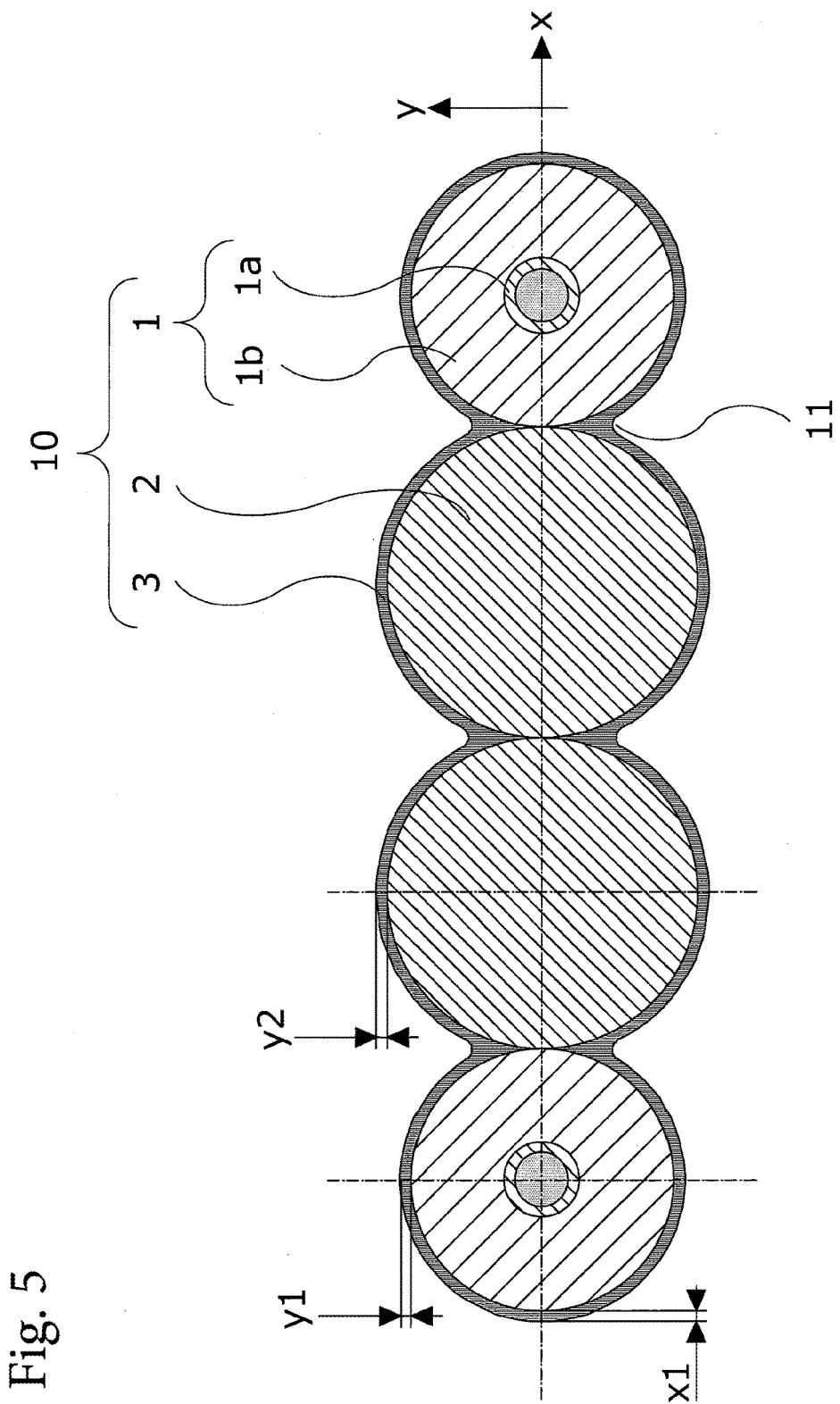
FIG. 5 is a cross-sectional view showing another embodiment of the plastic optical fiber ribbon of the present invention.

The plastic optical fiber 1a is composed of a core and a clad (as shown in FIG. 5), and a known one can be used. It may be either a refractive index distribution type (GI type) optical fiber, or a step refractive index type (SI type) optical fiber. It may be either a single mode optical fiber or a multicore optical fiber.

As the material of the plastic optical fiber 1a, for example, a fluororesin, an acrylic resin, a polycarbonate resin or a cycloolefin resin may be mentioned.

As the material of the reinforcing layer 1b, a known material may be used. For example, an acrylic resin, a polycarbonate resin, vinylidene fluoride, polyethylene terephthalate, nylon, an ultraviolet curable urethane acrylate resin or a cycloolefin resin may be mentioned.

When the optical fiber 1 has another covering layer around the reinforcing layer 1b, a known material may be used as the material of another covering layer. For example, an ultraviolet curable epoxy acrylate resin or an electron beam curable epoxy acrylate resin may be mentioned.

The outer diameter of the optical fiber 1 is not particularly limited. For example, it is preferably from 200 to 750 μm, more preferably from 245 to 400 μm. The Young's modulus of the optical fiber 1 is preferably from 750 to 2,500 MPa, more preferably from 1,000 to 2,500 MPa, further preferably from 1,200 to 2,500 MPa, particularly preferably from 1,400 to 2,000 MPa. When the Young's modulus of the optical fiber 1 is at least the lower limit value in the above range, a problem such as an increase in loss is unlikely to be caused during handling the optical fiber ribbon, and when the Young's modulus of the optical fiber 1 is at most the upper limit value, an increase in transmission loss of the optical fiber can be suppressed.

The plastic wire 2 is made of a plastic material. The Young's modulus of the plastic wire 2 is at least 3,000 MPa, preferably at least 4,000 MPa, more preferably at least 6,000 MPa, particularly preferably at least 8,000 MPa.

When the Young's modulus of the plastic wire 2 is at least the above lower limit value, the effect of suppressing an increase in loss when the optical fiber ribbon 10 is subjected to the tensile force in the longitudinal direction is excellent.

The upper limit value of the Young's modulus of the plastic wire 2 is not particularly limited, but is preferably at most 15,000 MPa, more preferably at most 12,000 MPa, from the viewpoint of coating stability at the time of ribbon production.

The outer diameter of the plastic wire 2 is preferably from 200 to 800 μm, more preferably from 250 to 450 μm.

The absolute value of the difference between the outer diameter of the optical fiber 1 and the outer diameter of the plastic wire 2 is preferably from 0 to 110 μm, more preferably from 0 to 100 μm, further preferably from 10 to 50 μm.

In particular, when the outer diameter of the plastic wire 2 is larger than the outer diameter of the plastic optical fiber 1 (as shown in FIG. 5), at the time when crush is applied from the thickness direction of the optical fiber ribbon 10, the effect to relax the stress transmitted to the optical fiber 1 is excellent, such being preferred. In this case, the difference between the outer diameter of the plastic wire 2 and the plastic optical fiber 1 is preferably at least 10 μm, more preferably at least 20 μm, further preferably at least 50 μm. The upper limit of the difference in the outer diameters is preferably at most 110 μm, more preferably at most 100 μm, further preferably at most 50 μm, particularly preferably at most 10 μm, from the viewpoint of coating stability during ribbon processing.

The plastic wire 2 has no optical transmission function. It is preferably made of a uniform plastic material. For example, an elongated body of plastic material is preferred. The plastic material constituting the plastic wire 2 may have a Young's modulus after curing falling within the above-mentioned range, and it is preferred that it is stretchable.

For example, polyethylene terephthalate (PET), nylon, polycarbonate, polyacetal, polybutylene terephthalate or the like is preferably used.

When transparency is required for the plastic wire 2, polyethylene terephthalate (PET) or polycarbonate is preferred.

As the material of the collective coating 3, for example, an ultraviolet curable resin or an electron beam curable resin, such as urethane acrylate, or an ultraviolet curable resin or an electron beam curable resin, such as epoxy acrylate, is preferred.

When transparency is required for the collective coating 3, a urethane acrylate resin is preferred.

The Young's modulus of the collective coating 3 is preferably at least 400 MPa, and is preferably at most 1,000 MPa. Particularly, it is preferably from 400 to 1,000 MPa, more preferably from 500 to 800 MPa. When the Young's modulus of the collective coating 3 is at least the lower limit value in the above range, a problem such as separation is unlikely to occur at the time of handling the ribbon, and when the Young's modulus is at most the upper limit value, an increase in transmission loss after ribbonization of the optical fiber can be suppressed.

The thickness of the collective coating 3 is such that when y1 represents the thickness of the collective coating 3 in the Y direction passing through the center of the optical fiber 1, y2 represents the thickness of the collective coating 3 in the Y direction passing through the center of the plastic wire 2, and x1 represents the thickness of the collective coating 3 in the X direction passing through the centers of the optical fiber 1 and the plastic wire 2, y1 and y2 are preferably from 3 to 50 μm, more preferably from 5 to 20 μm, further preferably from 5 to 10 μm. y1 and y2 may be the same or different. x1 is preferably from 3 to 50 μm, more preferably from 5 to 20 μm, further preferably from 5 to 10 μm.

The optical fiber ribbon 10 can be produced by applying a resin to the outer circumference of the optical fibers 1 and the plastic wires 2 in such a state that the optical fibers 1 and the plastic wires 2 are aligned in parallel and in a row and curing the resin to form the collective coating 3. The application of the resin can be carried out by a method in which the optical fibers 1 and the plastic wires 2 are permitted to enter and run through a coating die. The cross-sectional shape of the optical fiber ribbon 10 can be controlled by the shape of the die at the exit of the coating die.

The optical fiber ribbon 10 in the present embodiment is excellent in tensile strength, since the optical fibers 1 and the plastic wires 2 having a high Young's modulus are integrated. Further, since the optical fibers 1 and the plastic wires 2 can be used for connection with an equipment, etc. in the state of the optical fiber ribbon 10 without separating the optical fibers 1 and the plastic wires 2, it is also excellent in tensile strength during use after the connection.

By constructing the plastic wires 2 by using a plastic with high transparency, it is possible to realize an optical fiber ribbon 10 with high transparency. Or, as the case requires, it is easy to color the plastic wires 2 to have a desired color tone.

Although the optical fiber ribbon in the present embodiment comprises two optical fibers and two plastic wires, the number of optical fibers may be one, or three or more. When at least two optical fibers are provided, an optical fiber ribbon capable of multi-core collective connection is obtained. In the case where at least two optical fibers are provided, it is preferable that the outer surfaces of these optical fibers are in contact with each other, since axis alignment will be easy in multi-core collective connection. The upper limit of the number of optical fibers constituting the optical fiber ribbon is not particularly limited, but is preferably at most 8, more preferably at most 4, from the viewpoint of reducing the cable diameter.

The number of plastic wires may be one, or three or more. In the embodiment as shown in FIG. 1. the plastic wires are disposed outside the optical fibers, but a plastic wire may be disposed between an optical fiber and an optical fiber as shown in FIG. 5. The upper limit of the number of plastic wires constituting the optical fiber ribbon is not particularly limited, but it is preferably at most 5, more preferably at most 3, from the viewpoint of coating stability at the time of ribbonization. The outer surface of the plastic wire may be in contact with the outer surface of the optical fiber or plastic wire adjacent thereto, or may not be in contact therewith.

In the optical fiber ribbon of the present embodiment, concave grooves 11 are formed on the outer surfaces on both sides in the thickness direction of the optical fiber ribbon, but one or both of the outer surfaces on both sides in the thickness direction may not have the concave grooves 11 and may be a flat surface. When the concave grooves 11, which are V grooves as shown in FIG. 5. are formed on at least one of the outer surfaces, alignment with V grooves will be easy when a fixing member having the V grooves is used.

EXAMPLES

Hereinafter, the present invention will be described in more detail with reference to Examples, but the present invention is not limited to these Examples.
<Measurement Methods>
[Increase in Loss Due to Tensile Force]

Using a tensile tester AUTOGRAPH AG-IS (product name) manufactured by Shimadzu Corporation, an increase in loss due to tensile force was measured in accordance with JIS-C6823. First, an optical fiber ribbon to be measured (hereinafter referred to as a sample to be measured) was cut into a length of 6 m, and after wound three times around mandrels (150 mm diameter) of a tensile tester, both ends of the optical fiber ribbon were fixed, respectively. The distance between both mandrels was 1 m. One end of the sample to be measured was connected to an LED light source with a wavelength of 850 nm via an excitation device and the other end was connected to a light receiver. The initial power P0 and the optical power P1 when a predetermined tensile force was applied, were measured, and from the difference, the optical loss when a tensile force was applied, was calculated.
[Elongation Amount]

In accordance with JIS-C6837, a stress/strain curve at the time of measuring an increase in loss due to tensile force as described above, was obtained. From the obtained stress/strain curve, the elongation amount of the sample to be measured was calculated.
[Increase in Loss Due to Crush]

Figure 2:
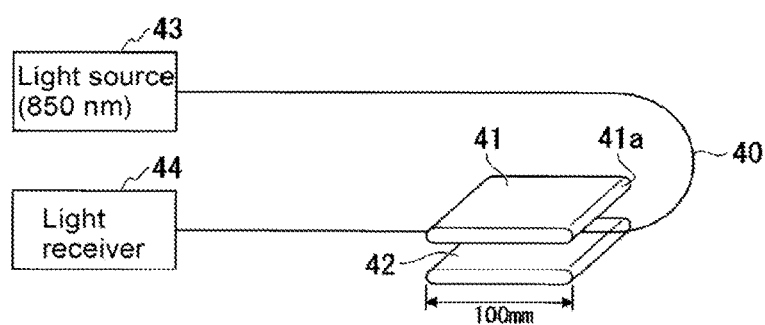
FIG. 2 is a schematic configuration diagram for explaining a method of measuring an increase in loss by crush.

Using the apparatus as shown in FIG. 2, an increase in loss due to a crush load was measured in accordance with JIS-C6821. First, a sample 40 to be measured, was cut to a length of 3 m, a central portion of the sample 40 was sandwiched between a pair of plates 41 and 42, and the sample 40 to be measured was bent into a U-shape along the outer surface of one plate 41. The length of the flat surface of the plates 41 and 42 in the longitudinal direction of the sample 40 to be measured was 100 mm, and the curvature radius of the curved surface 41a at both ends of the plate was 5 mm. That is, the bending radius of the sample 40 to be measured was 5 mm. One end of the sample 40 to be measured was connected to an LED light source 43 with a wavelength of 850 nm via an excitation device (not shown), and the other end was connected to a light receiver 44. First, the initial power P0 was measured, then the optical power P1 when a load (crush) of 50 N/100 mm was applied by the plates 41 and 42, was measured, and from the difference, the optical loss when crush was loaded, was calculated.

Example 1

An optical fiber ribbon having the structure shown in FIG. 1 was produced by using two optical fibers and two plastic wires (material: PET). The outer diameters and the Young's modulus of the optical fiber and the plastic wire were as shown in Table 1 (the same applies hereinafter).

The material of the collective coating was an ultraviolet-curable urethane acrylate resin, and the Young's modulus was 560 MPa. The thickness of the collective coating was almost uniform at the portions other than the concave grooves and was set to be 5 μm.

With respect to the obtained optical fiber ribbon, the increase in loss due to tensile force was measured by the above method, and the results are shown in Table 1 (the same applies hereinafter).

Figure 3:
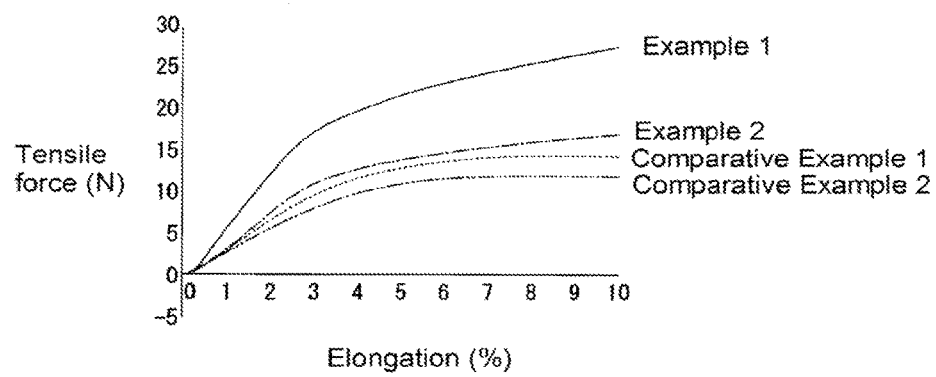
FIG. 3 is a graph showing the measurement results of the elongation amounts of plastic optical fiber ribbons.
Figure 4:
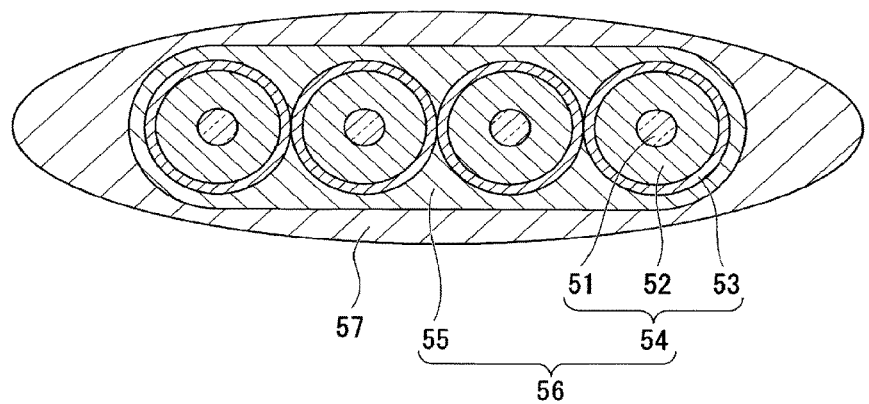
FIG. 4 is a cross-sectional view showing an example of a conventional optical fiber cable.

The results of measurement of elongation by the above method are shown in the graph of FIG. 3 (the same applies hereinafter).

Example 2

In Example 1, the plastic wire was changed to a plastic wire (material: nylon) shown in Table 1. Other than that, this Example was the same as in Example 1.

Comparative Example 1

In Example 1, the plastic wire was changed to a plastic wire (material: polycarbonate) shown in Table 1. Other than that, this Comparative Example was the same as Example 1.

Comparative Example 2

In Example 1, two plastic wires were not used, but instead, the number of optical fibers was changed to four. Other than that, this Comparative Example was the same as Example 1.

TABLE 1

|  |  | Ex. 1 | Ex. 2 | Comp. Ex. 1 | Comp. Ex. 2 |
|---|---|---|---|---|---|
| Number of optical fibers |  | 2 | 2 | 2 | 4 |
| Number of plastic wires |  | 2 | 2 | 2 | 0 |
| Diameter of optical fiber [μm] |  | 245 | 245 | 245 | 245 |
| Diameter of plastic wire [μm] |  | 200 | 250 | 250 | — |
| Young's modulus of optical fiber [MPa] |  | 1400 | 1400 | 1400 | 1400 |
| Young's modulus of plastic wire [MPa] |  | 8000 | 3500 | 2000 | — |
| Increase in loss due to tensile force | 5N | No increase in loss | No increase in loss | No increase in loss | No increase in loss |
|  | 15N | No increase in loss | +0.2 dB | +0.7 dB | +0.9 dB |

From the results in Table 1 and FIG. 3, in Examples 1 and 2 in which plastic wires having a Young's modulus of at least 3,000 MPa, and optical fibers were collectively coated, the elongation when a tensile force was applied was suppressed, and the increase in loss due to the tensile stress was also suppressed sufficiently small. In particular, in Example 1, the elongation was suppressed to at most 3% even when the tensile force was 15 N, and the tensile strength was excellent.

In contrast, in Comparative Example 1 in which the Young's modulus of the plastic wires was 2,000 MPa, the effect of suppressing the elongation was small, and the effect of suppressing the increase in loss due to the tensile stress was also small.

Examples 3 to 5

In Example 1, the outer diameter of the plastic wire was changed as shown in Table 2. Other than that, these Examples were the same as Example 1.

With respect to the obtained optical fiber ribbons, Table 2 shows the measurement results of the increase in loss due to crush by the above method.

TABLE 2

|  | Ex. 1 | Ex. 3 | Ex. 4 | Ex. 5 |
|---|---|---|---|---|
| Diameter of optical fiber [μm] | 245 | 245 | 245 | 245 |
| Diameter of plastic wire [μm] | 200 | 245 | 255 | 350 |
| Increase in loss due to crush (50N/100 mm) | +0.4 dB | +0.1 dB | No increase in loss | No increase in loss |

As shown in the results of Table 2, in Examples 4 and 5 in which the outer diameter of the plastic wire was larger than the outer diameter of the plastic optical fiber, the effect of suppressing the increase in loss due to crush was excellent.

The entire disclosure of Japanese Patent Application No. 2016-113630 filed on Jun. 7, 2016 including specification, claims, drawings and summary is incorporated herein by reference in its entirety.

REFERENCE SYMBOLS

1: Plastic optical fiber
1a: Plastic optical fiber
1b: Reinforcing layer
2: Plastic wire
3: Collective coating
10: Plastic optical fiber ribbon
11: Concave groove

What is claimed is:

1. A plastic optical fiber ribbon, comprising:
   at least one plastic optical fiber comprising a core, a clad, and a reinforcing layer,
   at least one plastic wire having a Young's modulus of at least 3,000 MPa, and
   a collective coating,
   wherein
   the at least one plastic optical fiber and the at least one plastic wire are arranged so that their central axes are parallel to each other in the same plane,
   the at least one plastic optical fiber and the at least one plastic wire are integrated by the collective coating, and
   an outer diameter of the plastic wire is larger than an outer diameter of the plastic optical fiber.

2. The plastic optical fiber ribbon according to claim 1, wherein the Young's modulus of the plastic optical fiber is from 750 to 2,500 MPa.

3. The plastic optical fiber ribbon according to claim 1, wherein a difference between the outer diameter of the plastic wire and the outer diameter of the plastic optical fiber is at least 10 μm.

4. The plastic optical fiber ribbon according to claim 1, wherein a difference between the outer diameter of the plastic wire and the outer diameter of the plastic optical fiber is from 10 to 110 μm.

5. The plastic optical fiber ribbon according to claim 1, wherein
   at least two plastic optical fibers are provided, and
   outer surfaces of the plastic optical fibers are in contact with one another.

6. The plastic optical fiber ribbon according to claim 5, wherein at least plastic wires are provided and disposed outside the plastic optical fibers.

7. The plastic optical fiber ribbon according to claim 5, wherein
   at least two plastic wires are provided, and
   at least one plastic wire is disposed between the plastic optical fibers.

8. The plastic optical fiber ribbon according to claim 1, wherein the collective coating is shaped to follow outer surfaces of the plastic optical fiber and the plastic wire.

9. The plastic optical fiber ribbon according to claim 1, wherein
   at least one concave groove is formed on at least one side of outer surfaces of the plastic optical fiber ribbon in a thickness direction of the plastic optical fiber ribbon, and
   the thickness direction of the plastic optical fiber ribbon is defined as a direction perpendicular both to a length direction of the plastic optical fiber and to a direction connecting centers of the plastic optical fiber and the plastic wire.

10. The plastic optical fiber ribbon according to claim 9, wherein the concave groove is a V groove.

11. The plastic optical fiber ribbon according to claim 1, wherein the collective coating has a Young's modulus of at least 400 MPa.

12. A method for producing the plastic optical fiber ribbon according to claim 1, the method comprising:
   applying a resin to outer circumferences of the plastic optical fiber and the plastic wire aligned in parallel and in a row, and
   curing the resin to form the collective coating.

13. The method according to claim 12, wherein said applying is carried out by running the plastic optical fiber and the plastic wire through a coating die.

* * * * *